Oct. 8, 1935.   W. A. READY   2,017,030
MANUFACTURE OF SHOVELS AND LIKE TOOLS

Filed Dec. 1, 1933

Inventor:
William A. Ready
by Emery, Booth, Varney & Townsend
Attys

Patented Oct. 8, 1935

2,017,030

UNITED STATES PATENT OFFICE 2,017,030

MANUFACTURE OF SHOVELS AND LIKE TOOLS

William A. Ready, Brookline, Mass., assignor to Ames Baldwin Wyoming Co., Parkersburg, W. Va., a corporation of Delaware Application December 1, 1933, Serial No. 700,516

5 Claims. (Cl. 76—113)

This invention relates to the manufacture of shovels or like tools of the type having a handle-receiving extension welded to the blade proper and the object is to simplify and cheapen the manufacture of such tools and to obviate wastage of material.

My invention will be well understood by reference to the following description taken in connection with the accompanying drawing, wherein:—

Figure 1:
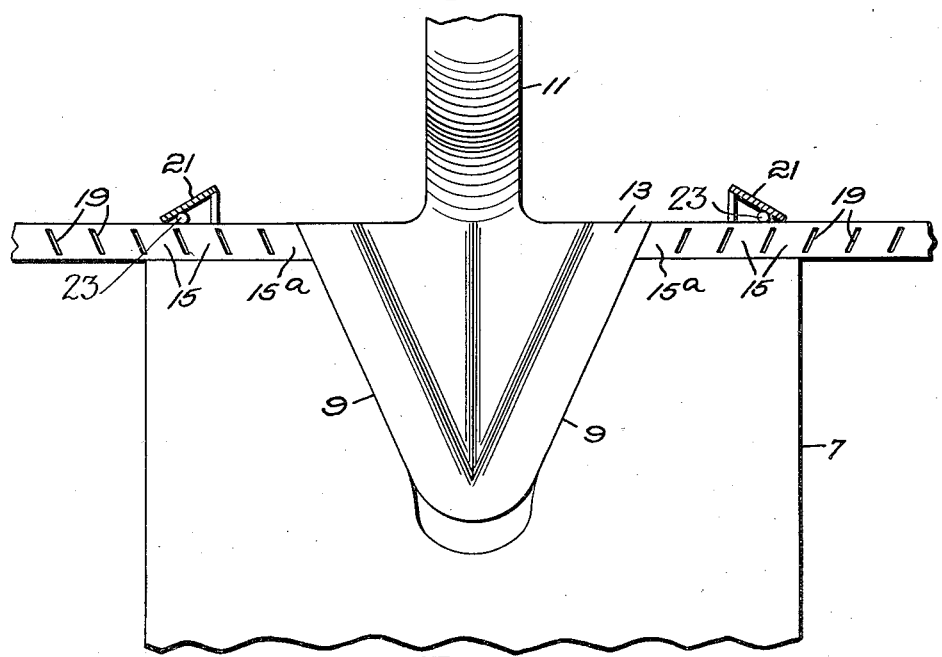
Figure 2:
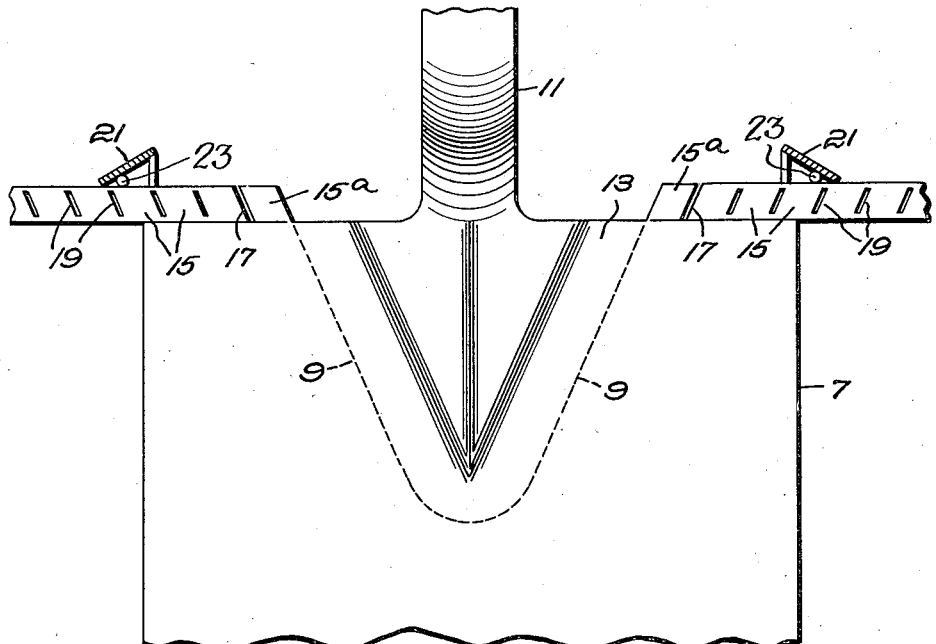

Fig. 1 is a broken plan view showing the parts in the position which they occupy at the beginning of the welding operation; and Fig. 2 is a similar view showing the parts at the conclusion of the welding operation.

The blade of the shovel is herein formed from a blade blank proper 7 provided at its rear end with a notch or recess having the converging sides 9 to which the handle-receiving extension is butt-welded. This extension may be formed from two similar superposed pieces as hitherto practised and is herein shown as embodying the relatively narrow socket or strap portions 11 adapted to fit closely about the handle, and the enlarged head 13 having converging sides adapted to mate wtih the sides 9 of the notch and to be butt-welded thereto.

The head 13 cannot be made of the same size as the notch since in the welding operation metal is actually fused and burned away. Therefore as in the prior art the enlarged head 13 is made wider than the notch so that its sides seat against the sides 9 shown in Fig. 1 before bottoming in the notch. Hitherto the notch has been made deep enough so that when in this position the sides of the notch would engage the sides of the head 13 throughout their length as if, for example, in Fig. 1 the blank 7 extended upwardly to the line defining the shoulders of the head. Such an arrangement was essential to permit proper heating of the parts in the welding operation. The parts being heated, the head was advanced until it bottomed in the notch and became connected to the blade blank throughout its margin and in this movement the shoulders of the head advanced inwardly beyond the rear edge of the blank, leaving projecting portions of the latter at either side which were thereafter trimmed away. One of the objections to this is the waste of relatively expensive stock from which the blade is formed.

In contrast to such a process I herein make the depth of the notch 9 substantially equal to the length of the head 13 so that when the latter is preliminarily seated therein the head will project beyond the rear edge of the blank, and when the welding is completed as in Fig. 2 the shoulders of the head will have advanced to the line of this rear edge. To permit the margin of the head to be properly heated so that the welding may be effected I provide a suitable heat-conducting bridge between the portions of the side of the head which in the position of Fig. 1 protrude beyond the rear of the blank and the blank itself. For this purpose I may utilize metal of relatively soft and cheap quality. Small pieces 15a of restricted transverse dimension, that is, short in the direction of the rear edge of the blade blank 7, and fitting between the projecting portion of the head and this rear edge may be utilized. In the welding operation the head travels past these to the position of Fig. 2. Even if the parts 15a are separate pieces as in the embodiment shown and hereinafter to be more fully described, they will weld to the back of the blade forming a small lug, as indicated in Fig. 2, which, however, is easily trimmed away.

Such separate heat-conducting bridge pieces may be mechanically positioned and I have herein shown a series of such pieces denoted generally by the numeral 15, the numeral 15a being appropriated to the terminal piece, connected together in strip form. Viewed in another way, the present disclosure is of a strip, the end portion of which, 15a, is utilized as a heat-conducting bridge, and which after the completion of the welding operation may be severed from the main body of the strip as along the line 17 (Fig. 2). In the present instance this strip is preliminarily partially severed by slots 19 along which the cutting as at 17 is effected and thus is in the form of a series of small pieces of restricted transverse dimension connected together in a manner somewhat analogous to the well known strip staples or strip nails.

The strip from which the bridge pieces 15 are supplied may be mechanically positioned against the rear edge of the blade blank 7 and pressed against the projecting sides of the head 13, as herein diagrammatically illustrated by the showing of the one-way grip devices 21 in the nature of ball clutches. While the detailed construction of such devices in itself forms no part of the present invention, the illustration is sufficient to make clear that if the devices shown move inwardly toward the center line of the blade ball or roller 23 jams between the strip and the opposed inclined surface to grip the former and feed it inwardly. When they are moved outwardly away from the center line the grip of the balls on the strips is released and the devices may retreat without retracting the strips. An example of a rectilinearly reciprocating intermittent feeding device operating in this manner is found in British patent to H. D. Berridge 9138 of 1910. The parts being firmly held together in the position of Fig. 1, electric current is applied, the metal is heated along the junction of the sides of the head 13 with the adjacent parts. Then as the metal fuses and is burned away, the head is advanced in the notch until it reaches the position of Fig. 2 when the entire margin of the head is connected to the blade blank 7 and the shoulders of the head have travelled into line with the rear edges of the blank. The end of the strip may then be cut off as along the line 17, herein by a cut along one of the slots 19 where it has been partially severed and the shovel removed with the part 15a attached as a small lug. This lug is easily trimmed off and the shovel may be brought to finished form in any known or suitable manner. In Fig. 2 the grip devices 21 have been shown as retracted outwardly in position to advance the new end of the strip to the position of Fig. 1 for cooperation with another piece of work.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. The method of forming a shovel blade having a handle-receiving extension which comprises forming a blade blank having a tapering notch at the back, forming a handle-receiving portion having a correspondingly tapered end of approximately the form and depth of said notch but wider, positioning adjacent the back of the blade heat-conducting metal pieces having edges presenting continuations of the sides of the notch, entering the end into said notch to oppose its edges to said edges and sides and electrically butt-welding the end to the blade while advancing it into the notch until the outer portion of said end reaches the position of the rear edge of the blade blank.

2. The method of forming a shovel blade having a handle-receiving extension which comprises forming a blade blank having a tapering notch at the back, forming a handle-receiving portion having a correspondingly tapered end of approximately the form and depth of said notch but wider, forming by the addition of pieces of heat-conducting metal of restricted transverse extent applied at the back of the blank a rearward extension of the sides of the notch, entering the end into said notch to oppose its edges to said extended sides and electrically butt-welding the ends to the blade while advancing it into the notch until the outer portion of said end reaches the position of the rear edge of the blade blank.

3. The method of forming a shovel blade having a handle-receiving extension which comprises forming a blade blank having a tapering notch at the back, forming a handle-receiving portion having a correspondingly tapered end of approximately the form and depth of said notch but wider, mechanically positioning small heat-conducting metal blanks at the rear end of the blade blank, which first mentioned blanks have edges presenting when thus positioned continuations of the sides of the notch, entering the end into said notch to oppose its edges to said edges and sides and electrically butt-welding the end to the blade while advancing it into the notch until the outer portion of said end reaches the position of the rear edge of the blade blank.

4. The method of forming a shovel blade having a handle-receiving extension which comprises forming a blade blank having a tapering notch at the back, forming a handle-receiving portion having a correspondingly tapered end of approximately the form and depth of said notch but wider, mechanically positioning along the rear end of the blade blank strips of heat-conducting metal having end edges presenting when thus positioned continuations of the sides of the notch, entering the end into said notch to oppose its edges to said edges and sides, electrically butt-welding the end to the blade while advancing it into the notch until the outer portion of said end reaches the position of the rear edge of the blade blank and severing end portions of the strips.

5. The method of forming a shovel blade having a handle-receiving extension which comprises forming a blade blank having a tapering notch at the back, forming a handle-receiving portion having a correspondingly tapered end of approximately the form and depth of said notch but wider, inserting said end in the notch to engage the sides thereof, locating heat-conducting bridging means between the rear edge of the blade adjacent the notch and the adjacent projecting sides of said end and electrically butt-welding the end to the blade while advancing the former into the notch until the outer portion of said end reaches the position of the rear edge of the blade blank.

WILLIAM A. READY.